United States Patent [19]

Matsuki et al.

[11] Patent Number: 4,923,948

[45] Date of Patent: May 8, 1990

[54] CURABLE COMPOSITION

[75] Inventors: Yasuo Matsuki, Yokohama; Yosinobu Kariya, Yokkaichi; Masayuki Endo, Yokohama; Hiroharu Ikeda, Machida; Yoshihiro Hosaka, Yokohama, all of Japan

[73] Assignee: Japan Synthetic Rubber Co., Ltd., Tokyo, Japan

[21] Appl. No.: 247,449

[22] Filed: Sep. 22, 1988

[30] Foreign Application Priority Data

Sep. 24, 1987 [JP] Japan .................................. 62-237289
Oct. 16, 1987 [JP] Japan .................................. 62-259516
Feb. 24, 1988 [JP] Japan .................................. 63-39610

[51] Int. Cl.$^5$ ............................................. C08G 77/04
[52] U.S. Cl. ........................................ 528/26; 525/431
[58] Field of Search ........................... 525/431; 528/26

[56] References Cited

U.S. PATENT DOCUMENTS 4,780,501 10/1988 Rich ....................................... 528/26
4,794,153 12/1988 Rich ....................................... 528/26
4,795,680 1/1989 Rich et al. ............................... 528/26

Primary Examiner—Melvin I. Marquis
Attorney, Agent, or Firm—Oblon, Spivak, McClelland, Maier & Neustadt

[57] ABSTRACT

A curable composition comprising (a) an amic acid compound and/or an imide compound each containing a silicon atom having at least one hydrolyzable group and (b) an organosilane compound represented by the formula (I):

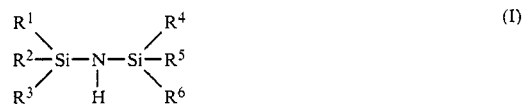

wherein $R^1$–$R_6$, which may be the same or different, are alkyl groups of 1–10 carbon atoms or aryl groups of 6–10 carbon atoms. Said composition is suitably used for the formation of a protective film for a transparent substrate or a color filter in liquid crystal display devices.

7 Claims, No Drawings

CURABLE COMPOSITION

This invention relates to a curable composition suitably used for formation of a protective film of, for example, a transparent substrate or a color filter in liquid crystal display devices.

Many proposals have recently been made as to a color liquid crystal display device in which a color filter for color separation is combined with a liquid crystal display device.

In combining a color filter with a liquid crystal display device for use as a color liquid crystal display device, the color filter and the liquid crystal display device are arranged in series in relation to the light path. Therefore, when the display is seen from the front, patterns appearing on the display are fine.

However, for example, when the color filter is arranged outside the liquid crystal display device, the picture elements displayed are fine and the display is seen from an oblique direction, "parallax" is caused owing to the thickness of the glass used in the liquid crystal device.

In order to prevent this parallax, a color liquid crystal display device has been proposed in which a color filter is arranged inside a liquid crystal display device.

As to arranging a color filter inside a liquid crystal display device, it is known that a color filter is placed between a transparent electrode composed of ITO or the like and a substrate for the color filter. For example, known is a method comprising placing a color filter on a transparent substrate, vapor-depositing ITO on the color filter, forming a transparent electrode by a photolithography and then placing a liquid crystal thereon.

In this method, the color filter must have sufficient heat resistance and chemical resistance because, after the formation of a color filter on a transparent substrate, ITO is vapor-deposited on the color filter and then a transparent electrode is formed by a photolithography. Hence, the color filter must be protected with a protective film before the vapor deposition of ITO.

There has recently been proposed a color liquid crystal display device in which a glass plate of about 500 μm in thickness is placed on a color filter as a protective film therefor and a transparent electrode is formed on the glass plate.

When a glass plate is used as a color filterprotective film, it is impossible to sufficiently prevent the above-mentioned parallax because the liquid crystal layer and the color filter are arranged apart. When the picture elements displayed are fine, a sharp image cannot be obtained owing to the parallax.

As the transparent substrate for liquid crystal display device, glass substrates containing inorganic ions such as Na+ and the like are often used. When an ordinary liquid crystal display device is produced using said glass substrate, it is known that the inorganic ions in the glass substrate infiltrate into the liquid crystal, whereby the liquid crystal display device is affected adversely.

With respect to a protective film for such a color filter or transparent substrate, a so-called undercoat treatment is proposed in which a thin protective film made of an inorganic substance such as silicon dioxide is formed on the color filter or the transparent substrate. Since this undercoat treatment is effected at a high temperature such as 400°–500° C., the treatment cannot be applied to a substrate having a color filter because the color filter undergoes thermal decomposition at such a high temperature. In addition, undercoat treatment must be effected in an inert gas atmosphere in order to prevent the oxidation of a transparent electrode made of ITO or the like.

An object of this invention is to solve the above-mentioned technical problems.

Another object of this invention is to provide a curable composition usable for the formation of a protective film for a color filter, a transparent substrate or the like in color liquid crystal display devices, which protective film is uniform and dense, has excellent heat resistance and crack resistance, prevents the infiltration of components contained in the color filter, the transparent substrate, etc., into the liquid crystal, enables the formation of fine transparent electrode on the color filter, has excellent adhesion to the color filter, the transparent electrode, etc., and can solve the parallax in conventional color liquid crystal display devices.

According to this invention, there is provided a curable composition (hereinafter referred to simply as the composition) comprising the following components (a) and (b):

(a) an amic acid compound and/or an imide compound both containing a silicon atom having at least one hydrolyzable group (the silicon atom is hereinafter referred to as the hydrolyzable silicon atom), and (b) an organosilane compound represented by the formula (I) [hereinafter referred to simply as the organosilane compound (I)]:

wherein $R^1$–$R^6$, which may be the same or different, are alkyl groups of 1–10 carbon atoms or aryl groups of 6–10 carbon atoms.

(a) Amic acid compound and/or imide compound both containing the hydrolyzable silicon atom The component (a) includes high polymers formed when an amic acid compound containing the hydrolyzable silicon atom is heated or allowed to stand. That is, the amic acid compound undergoes dehydration and condensation reaction to be converted into an imide compound and the hydrolyzable silicon atom is hydrolyzed by the water produced by the above reactions or from the outside of the system, whereby dehydration and condensation reaction are repeated to form the high polymers.

The component (a) can be produced according to the following reaction (A) or (B).

(A) Reaction of a tetracarboxylic acid dianhydride with a silicon compound having an amino group and/or an imino group and at least one hydrolyzable group (the silicon compound is hereinafter referred to simply as the silicon compound)

(B) Reaction of a diamino compound with a dicarboxylic acid anhydride having a hydrolyzable silicon atom (the anhydride is hereinafter referred to as the silicon atom-containing dicarboxylic acid anhydride)

The tetracarboxylic acid dianhydride used in the reaction (A) includes aliphatic, alicyclic and aromatic tetracarboxylic acid dianhydrides. The aromatic tetracarboxylic acid dianhydrides include pyromellitic acid dianhydride, 3,3',4,4'-biphenyltetracarboxylic acid dianhydride, 2,2',3,3'-biphenyl tetracarboxylic acid dianhydride, 2,3,3',4'-biphenyltetracarboxylic acid dianhydride, 3,3',4,4'-benzophenonetetracarboxylic acid dianhydride, 2,3,3',4'-benzophenonetetracarboxylic acid dianhydride, 2,2',3,3'-benzophenonetetracarboxylic acid dianhydride, bis(3,4-dicarboxyphenyl) ether dianhydride, bis(3,4-dicarboxyphenyl) sulfone dianhydride, 1,2,5,6-naphthalenetetracarboxylic acid dianhydride and 2,3,6,7-naphthalenetetracarboxylic acid dianhydride, and the aliphatic and alicyclic tetracarboxylic acid dianhydrides include butanetetracarboxylic acid dianhydride, 1,2,3,4-cyclobutanetetracarboxylic acid dianhydride, 1,2,3,4-cyclopentanetetracarboxylic acid dianhydride, 2,3,5-tricarboxycyclopentylacetic acid dianhydride, 3,5,6-tricarboxynorbornane-2-acetic acid dianhydride, 5-(2,5-dioxotetrahydrofuryl)-3-methylcyclohexenedicarboxylic acid dianhydride, and bicyclo[2,2,2]-oct-7-ene-tetracarboxylic acid dianhydride.

Of these tetracarboxylic acid dianhydrides, preferred are pyromellitic acid dianhydride, 3,3',4,4'-biphenyltetracarboxylic acid dianhydride, 2,2',3,3'-biphenyltetracarboxylic acid dianhydride, 3,3',4,4'-benzophenonetetracarboxylic acid dianhydride, 1,2,3,4-cyclobutanetetracarboxylic acid dianhydride and 2,3,5-tricarboxycyclopentylacetic acid dianhydride.

These tetracarboxylic acid dianhydrides can be used alone or in combination of two or more.

The above tetracarboxylic acid dianhydrides may be modified with a diamino compound (described hereinafter) used in the reaction (B). These modified tetracarboxylic acid dianhydrides can be obtained by adding, preferably gradually, to a tetracarboxylic acid dianhydride or a solution or suspension of the dianhydride in a solvent (described hereinafter) a diamino compound in an amount equimolar to or smaller than the dianhydride and reacting them.

When the modified tetracarboxylic acid dianhydride is used, it is preferable that after or during the reaction of the tetracarboxylic acid dianhydride with the diamino compound the silicon compound is added to the reaction system to react the hydrolyzate with the resulting modified tetracarboxylic acid dianhydride. In this case, the reaction temperature is preferably, for example, about 0°-80° C.

The silicon compound used in the reaction (A) includes, for example, compounds represented by the general formulas (1) to (6).

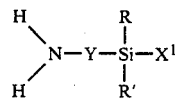
(1)

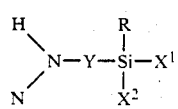
(2)

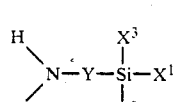
(3)

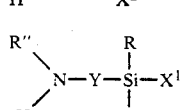
(4)

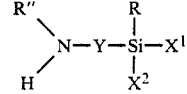
(5)

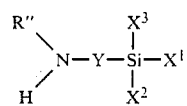
(6)

In the above general formulas (1) to (6), R, R' and R", which may be the same or different, aliphatic hydrocarbon groups of 1–5 carbon atoms (e.g., methyl, ethyl, n-propyl, i-propyl, n-butyl, i-butyl, n-pentyl, i-pentyl, neopentyl or the like) or aromatic hydrocarbon groups of 6–18 carbon atoms (e.g., phenyl, tolyl, xylyl, nitrophenyl, α-naphthyl or the like); $X^1$, $X^2$ and $X^3$, which may be the same or different, are alkoxy groups of 1–5 carbon atoms (e.g., methoxy, ethoxy, propoxy or the like) or halogen atoms (e.g., fluorine, chlorine, bromine or the like); and Y is a divalent aliphatic hydrocarbon group of 1–5 carbon atoms (e.g., methylene, ethylene, propylene, tetramethylene or the like), a divalent aromatic hydrocarbon group of 6–10 carbon atoms (e.g., phenylene, tolylene, xylylene, nitrophenylene, α-naphthylene or the like), or a group in which the divalent aliphatic hydrocarbon is bonded to the divalent aromatic hydrocarbon.

Specific examples of the silicon compound include the compound represented by the following structural formulas:

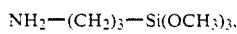

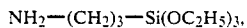

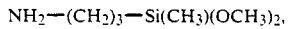

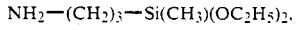

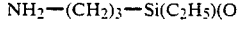

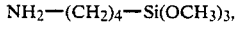

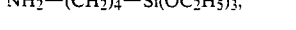

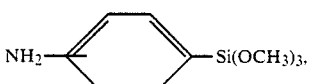

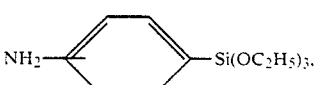

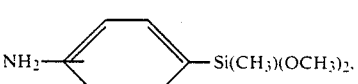

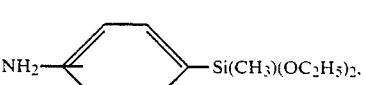

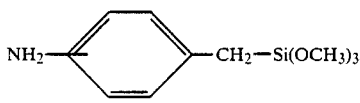

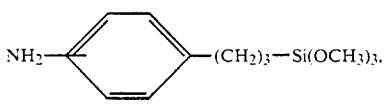

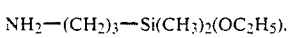

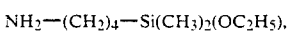

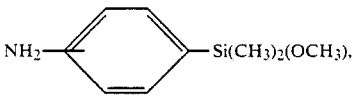

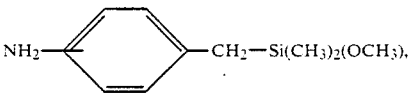

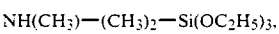

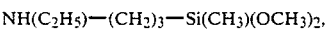

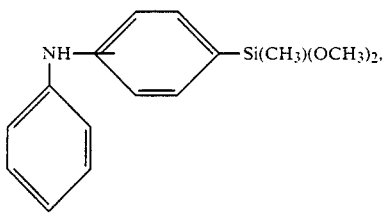

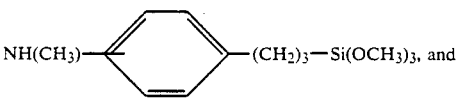

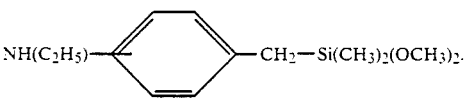

Of these silicon compounds, preferred are aminopropyltriethoxysilane, aminopropylmethyldiethoxysilane, p-aminophenyldiethoxysilane, p-aminopohenyltrimethoxysilane, p-aminophenylmethyldiethoxysilane, etc.

These silicon compounds can be used alone or in combination of two or more, and also in combination with a monoamine compound.

Specific examples of the monoamine compound include lower alkylamine compounds such as methylamine, ethylamine, propylamine, n-butylamine, i-butylamine, n-pentylamine, i-pentylamine, n-hexylamine, cyclohexylamine and the like, and arylamine compounds such as aniline, toluidine, naphthylamine and the like. These monoamine compounds can be used usually in an amount of 90 mole % or less, preferably 10-90 mole %, based on the total amount of the silicon compound and the monoamine compound. When the amount is less than 10 mole %, the resulting composition has inferior storage stability in some cases. When the amount is more than 90 mole %, the resulting composition has insufficient curability.

The silicon compound may be a partial hydrolyzate obtained by partially hydrolyzing the silicon compound in the presence of an organosilane compound (I) [the component (b)] and/or an organosilane compound represented by the following general formula (II) [hereinafter referred to simply as the organosilane compound (II)]:

$$R^7{}_n Si(OR^8)_{4-n} \qquad (II)$$

wherein $R^7$ is an organic group of 1-8 carbon atoms, $R^8$ is an alkyl group of 1-4 carbon atoms or an acyl group of 1-4 carbon atoms, and n is an integer of 1-3.

In the above general formula (I), $R^1$ to $R^6$ are, for example, alkyl groups of 1-10 carbon atoms or aryl groups of 6-10 carbon atoms such as methyl, ethyl, n-propyl, i-propyl, n-butyl, sec-butyl, tert-butyl, n-pentyl, i-pentyl, neopentyl, n-hexyl, cyclohexyl, n-heptyl, n-octyl, n-nonyl, n-decyl, phenyl, tolyl, xylyl, nitrophenyl, naphthyl and the like.

Specific examples of the organosilane compound (I) include hexamethyldisilazane, hexaethyldisilazane, hexapropyldisilazane, hexa-n-butyldisilazane, hexa-n-pentyldisilazane, ethylpentamethyldisilazane, diethyltetramethyldisilazane, trimethyltriethyldisilazane, n-propylpentamethyldisilazane, di-n-propyltetramethyldisilazane, tri-n-propyltrimethyldisilazane, tetramethyldiphenyldisilazane, trimethyltriphenyldisilazane, dimethyltetraphenyldisilazane, triethyltritolyldisilazane and pentamethyl-α-naphthyldisilazane. Of these, hexamethyldisilazane, hexaethyldisilazane and hexapropyldisilazane are preferred.

These organosilane compounds (I) can be used alone or in combination of two or more.

In the above general formula (II), $R^7$ as an organic group includes, for example, alkyl groups such as methyl, ethyl, n-propyl, i-propyl and the like, γ-chloropropyl group, a vinyl group, an allyl group, a 3,3,3-trifluoropropyl group, a γ-glycidoxypropyl group, a γ-methacryloyloxypropyl group, a γ-mercaptopropyl group, a phenyl group, a tolyl group, a 3,4-epoxycyclohexylethyl group, a γ-aminopropyl group and the like.

In the general formula (II), the alkyl group of $R^8$ includes, for example, methyl, ethyl, n-propyl, i-propyl, n-butyl, sec-butyl and tert-butyl; and the acyl group of $R^8$ includes formyl, acetyl, propionyl and butanoyl.

Specific examples of the organosilane compound (II) include trialkoxysilanes such as methyltrimethoxysilane, methyltriethoxysilane, n-propyltriethoxysilane, i-propyltriethoxysilane, γ-chloropropyltriethoxysilane, vinyltriethoxysilane, 3,3,3-trifluoropropyltriethoxysilane, γ-glycidoxypropyltriethoxysilane, γ-methacryloyloxypropyltriethoxysilane, γ-mercaptopropyltriethoxysilane, phenyltriethoxysilane, 3,4-epoxycyclohexylethyltriethoxysilane, methyltri-n-propoxysilane, methyltributoxysilane, methyltri-i-propoxysilane and the like; dialkoxysilanes such as dimethyldimethoxysilane, dimethyldiethoxysilane, dimethyldipropoxysilane, diethyldipropoxysilane, ethylpropyldiethoxysilane, dipropyldimethoxysilane, methylpentyldimethoxysilane, methylvinyldiethoxysilane, ethylallyldimethoxysilane, propylbutenyldipropoxysilane, ethylphenyldimethoxysilane, butylphenyldiethoxysilane, methyltolyldipropoxysilane, ethyl(dimethylphenyl)dibutoxysilane, phenylvinyldimethoxysilane, tolylallyldiethoxysilane, phenylbutenyldipropoxysilane and the like; and monoalkoxysilanes such as trimethylmethoxysilane, triethylmethoxysilane, tripropylethoxysilane, tributylpropoxysilane, triphenylmethoxysilane, triphenylethoxysilane and the like.

Of these, methyltrimethoxysilane, methyltriethoxysilane, phenyltrimethoxysilane, phenyltriethoxysilane, dimethyldimethoxysilane, dimethyldiethoxysilane, trimethylmethoxysilane and trimethylethoxysilane are preferred.

These can be used alone or in combination of two or more.

The presence of water is required when the silicon compound is hydrolyzed in the presence of the organosilane compound (I) and/or the organosilane compound (II), and this water may be ultrapure water, deionized water, distilled water, tap water or the like.

In the partial hydrolyzate in this case, 30-90% of the hydrolyzable group which the silicon atom had has been hydrolyzed.

The amount of the organosilane compound (I) or the organosilane compound (II) used or the total amount of the two when used together is preferably about 0.1-10 moles per mole of the silicon compound. When the amount is less than 0.1 mole, the resulting composition tends to have inferior storage stability. When the amount is more than 10 moles, the composition obtained tends to have inferior curability. The amount of water required for the hydrolysis of the silicon compound is preferably about 0.5-3 moles per mole of the silicon compound. When the amount is less than 0.5 mole, the hydrolysis does not take place sufficiently. When the amount is more than 3 moles, excessive water reacts with the tetracarboxylic acid dianhydride to render the resulting composition inferior in storage stability.

The temperature required for the hydrolysis of the silicon compound in the presence of the organosilane compound (I) and/or the organosilane compound (II) is preferably at least 60° C. The time required for the hydrolysis is about 0.1-10 hours.

In the reaction (A), the molar ratio of the tetracarboxylic acid dianhydride to the silicon compound is usually 1/1 to ⅓, preferably 1/1.5 to 1/2.5. The reaction temperature is 0°-60° C., preferably 0°-40° C. The reaction time is about 5-500 minutes.

The reaction product obtained in the reaction (A) has usually a polystyrene-reduced weight-average molecular weight of 500-50,000.

When in the reaction (A), for example, 3-aminopropyltriethoxysilane and 3,3',3,4'-benzophenonetetracarboxylic acid dianhydride are used, the following reaction takes place:

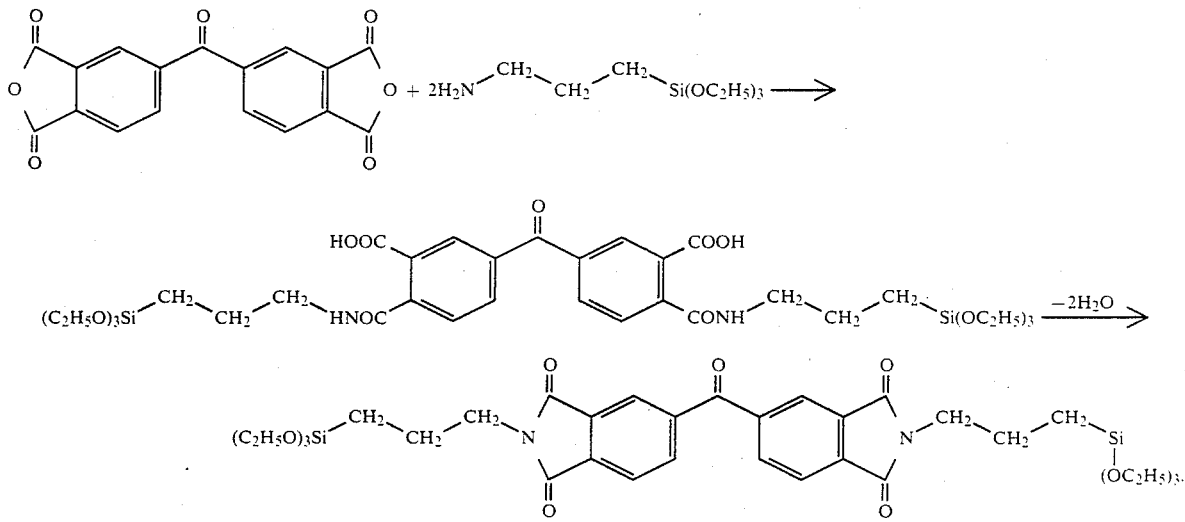

The diamino compound used in the reaction (B) includes aliphatic, alicyclic and aromatic diamines.

Specific examples of these diamines include paraphenylenediamine, metaphenylenediamine, 4,4'-diaminodiphenylmethane, 4,4'-diaminodiphenylethane, benzidine, 4,4'-diaminodiphenyl sulfide, 4,4'-diaminodiphenylsulfone, 4,4'-diaminodiphenyl ether, 1,5-diaminonaphthalene, 3,3'-dimethyl-4,4'-diaminobiphenyl, 3,4'-diaminobenzanilide, 3,4'-diaminodiphenyl ether, 3,3'-diaminobenzophenone, 3,4'-diaminobenzophenone, 4,4'-diaminobenzophenone, metaxlylenediamine, 1,3-propanediamine, tetramethylenediamine, pentamethylenediamine, hexamethylenediamine, heptamethylenediamine, octamethylenediamine, nonamethylenediamine, 4,4'-dimethylheptamethylenediamine, 1,4-diaminocyclohexane, isophoronediamine, tetrahydrodicyclopentadienylenediamine, hexahydro-4,7-methanoindanylenedimethylenediamine, tricyclo[6,2,1,0²·⁷]-undecylenedimethyldiamine and diaminoorganosiloxanes represented by the formula:

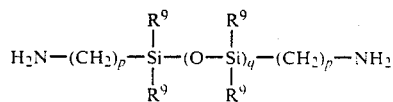

wherein $R^9$ is a methyl group or a phenyl group, p is an integer of 1-3 and q is an integer of 1-20.

Besides the above diamines, the following diamines can also be used: bis(4-aminophenyl)fluorene, diaminotetraphenylthiophene, 4,4'-phthalido-3,3'-diaminodiphenyl ether, 4,4'-phthalido-3,3'-diaminodiphenylmethane, 4,4'-phthalido-3,3'-diaminobenzophenone, 4,4'-acetamido-3,3'-diaminodiphenyl ether, 4,4'-acetamido-3,3'-diaminodiphenylmethane, 4,4'- acetamido-3,3'-diaminobenzophenone, 4-sulfonamido-1,3-phenylenediamine, 4,6-bis(aminophenyl)-1,3-phenylenediamine, 5-amino-1-(4'-aminophenyl)-1,3,3-trimethylindane, 6-amino-1-(4'-aminophenyl)-1,3,3-trimethylindane, etc.

These diamino compound can be used alone or in combination of two or more.

The above diamino compound may be modified by the reaction with the above-mentioned tetracarboxylic acid dianhydride. This modification product can be obtained by adding, preferably gradually, the tetracarboxylic acid dianhydride to a solution or suspension of the diamino compound in a solvent (described hereinafter).

The amount of the tetracarboxylic acid dianhydride used in the modification of the diamino compound is preferably 0.5 mole or less per mole of the diamino compound. The use of the diamino compound modified with the tetracarboxylic acid dianhydride enables the resulting component (a) to have an increased molecular weight and enhances the film formability of the resulting composition on substrate.

The temperature for reacting the tetracarboxylic acid dianhydride with the diamino compound is preferably about 0°–80° C.

The silicon atom-containing dicarboxylic anhydrides used in the above reaction (B) include the compounds represented by the following formulas (7) to (9):

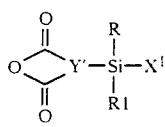  (7)

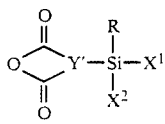  (8)

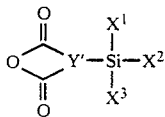  (9)

wherein R, R', $X^1$, $X^2$ and $X^3$ have the same meanings as defined above as to the formulas (1) to (6); Y' is a trivalent aliphatic hydrocarbon group of 2 to 20 carbon atoms, a trivalent alicyclic hydrocarbon group of 3 to 20 carbon atoms or a trivalent aromatic hydrocarbon group of 6 to 20 carbon atoms, or a trivalent group in which these groups are bonded to one another.

Specific examples of the silicon atom-containing dicarboxylic acid anhydrides represented by the formulas (7)–(9) include the compounds represented by the structural formulas:

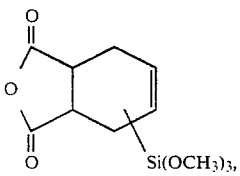

-continued

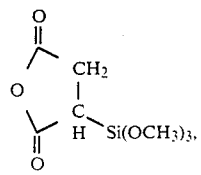

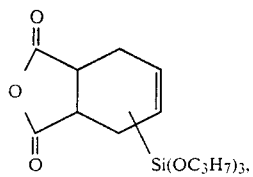

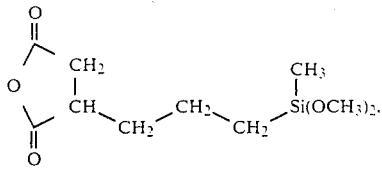

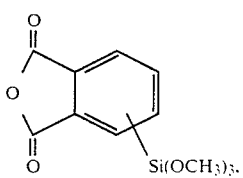

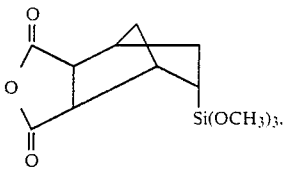

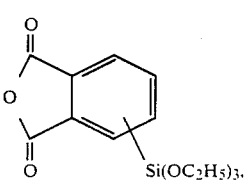

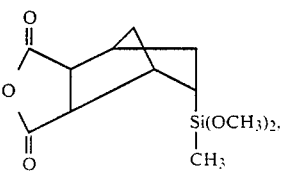

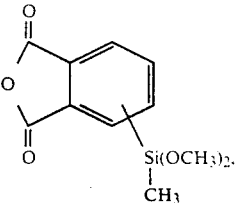

-continued

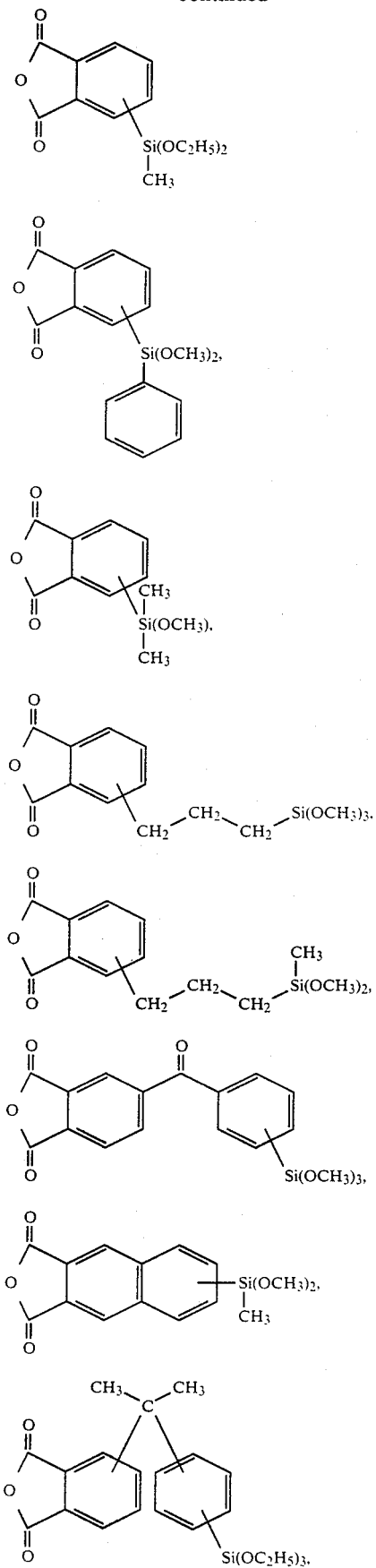

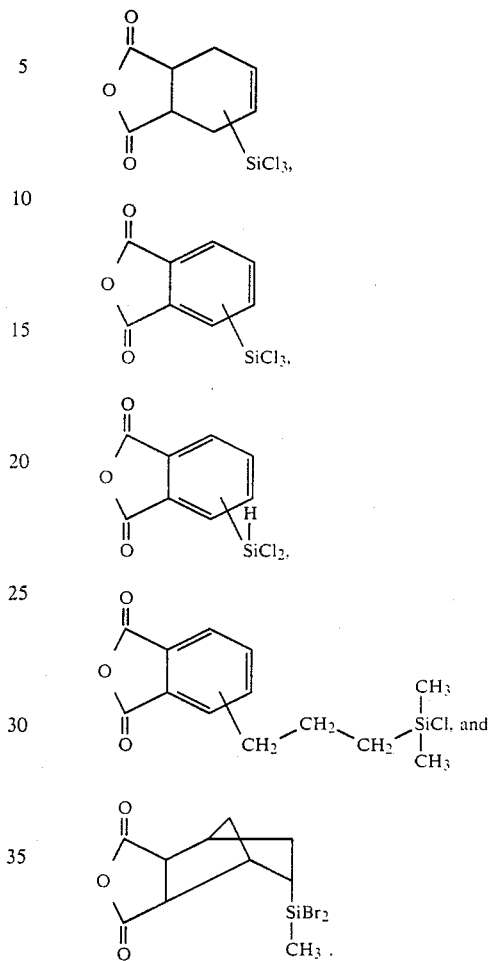

Of these silicon atom-containing dicarboxylic acid anhydrides, particularly preferred are 3-trimethoxysilyl-1,2,5,6-tetrahydrophthalic acid anhydride, 3-trimethoxysilylphthalic acid anhydride, 3-methyldimethoxysilylphthalic acid anhydride and 3-dimethylmethoxysilylphthalic acid anhydride.

These silicon atom-containing dicarboxylic acid anhydrides can be used alone or in combination of two or more.

In the reaction (B), a dicarboxylic acid anhydride such as phthalic anhydride, maleic anhydride, succinic anhydride or the like (this dicarboxylic acid anhydride is hereinafter referred to as the other dicarboxylic acid anhydride) can be used in an amount of 90 mole % or less, preferably 10-90 mole based on the total amount of the silicon atom-containing dicarboxylic acid anhydride and the other dicarboxylic acid anhydride. When the amount of the other dicarboxylic acid anhydride is less than 10 mole %, the resulting composition has inferior storage stability in some cases. When the amount is more than 90 mole %, the resulting composition has insufficient curability in some cases.

In the reaction (B), the molar ratio of the diamino compound to the silicon atom-containing dicarboxylic acid anhydride is usually 1/1-$\frac{1}{3}$, preferably 1/1.5-1/2.5. The reaction temperature is 0°-60° C., preferably 0°-40° C. The reaction time is about 5-500 minutes.

The polystyrene-reduced weight-average molecular weight of the reaction product obtained in the reaction (B) is usually 500–50,000, preferably 500–20,000.

When in the reaction (B), for example, 4,4'-diaminodiphenyl ether and 3-trimethoxysilyl-1,2,5,6-tetrahydrophthalic acid anhydride are used, the following reaction takes place.

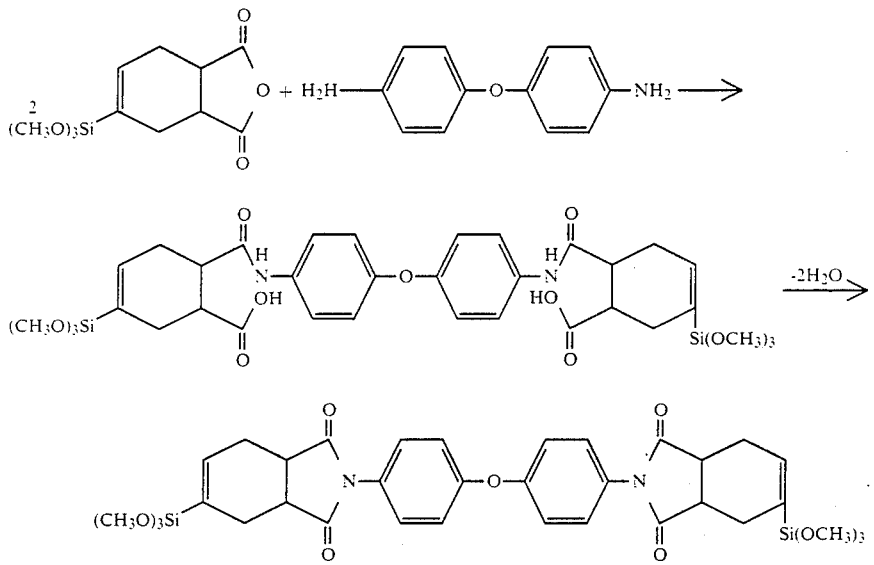

In the reactions (A) and (B), a catalyst may be used if necessary. Such a catalyst includes, for example, an inorganic acid (e.g., sulfuric acid, hydrochloric acid, nitric acid, phosphoric acid or the like) and an organic acid (e.g., paratoluenesulfonic acid, benzenesulfonic acid, trifluoroacetic acid, trichloroacetic acid or the like). The amount of the catalyst used is usually about 0.01–1 by weight of the silicon compound or the silicon atom-containing dicarboxylic acid anhydride.

Preferably, the reactions (A) and (B) are effected in a nitrogen atmosphere.

In the reactions (A) and (B), a solvent may be used. The solvent includes, for example, various organic solvents (described hereinafter) used for adjusting the concentration of the present composition.

The amount of the solvent used is usually 50–1,000 parts by weight, preferably 100–500 parts by weight, per 100 parts by weight of the total amount of the compounds fed to the reaction system.

(b) Organosilane compound (I)

The component (b) serves to improve the storage stability and adhesion to substrate of the component (a) and is the same compound as the previously mentioned organosilane compound (I).

The amount of the component (b) used is usually 5–200 moles, preferably 50–150 moles, per gram equivalent of the total of the carboxyl group and the imide group in the component (a). When the amount is less than 5 moles, the resulting composition has inferior storage stability. When the amount is more than 200 moles, the hardness of the resulting coating film becomes low in some cases.

The composition of this invention comprises the components (a) and (b). The composition is usually used in the form of an organic solvent solution.

The organic solvent includes alcohols, esters, ethers, ketones and amides.

The alcohols include methanol, ethanol, n-propyl alcohol, i-propyl alcohol, i-butyl alcohol, sec-butyl alcohol, tert-butyl alcohol, cyclohexanol, ethylene glycol, diethylene glycol, triethylene glycol, dipropylene glycol, glycerine, ethylene glycol monomethyl ether, ethylene glycol monoethyl ether, ethylene glycol monobutyl ether, diethylene glycol monoethyl ether, diethylene glycol monobutyl ether, diethylene glycol monomethyl ether and the like.

The esters include ethyl acetate, ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, γ-butyrolactone and the like.

The ethers include tetrahydrofuran, diethyl ether, dioxane, ethylene glycol dimethyl ether, ethylene glycol diethyl ether, diethylene glycol dimethyl ether and the like.

The ketones include acetone, methyl ethyl ketone, diisopropyl ketone, cyclohexanone and the like.

The amides include tetramethylurea, hexamethylphosphoramide, methylformamide, dimethylformamide, dimethylacetamide, N-methylpyrrolidone, N-acetylpyrrolidone and the like.

There may also be used sulfur-containing solvents such as dimethyl sulfoxide, dimethylsulfone and the like; aromatic hydrocarbon solvents such as benzene, toluene, xylene, durene and the like; and halogenated hydrocarbon solvents such as dichloromethane, chloroform, trichlene, chlorobenzene, dichlorobenzene and the like.

Of these organic solvents, alcohols, esters and ketones are preferred.

These organic solvents can be used alone or in combination of two or more.

It is preferable that these organic solvents are sufficiently dehydrated to a water content of, for example, 50 ppm or less as measured by the Karl Fischer's method.

The composition of this invention may further comprise nonionic surfactants.

The incorporation of these nonionic surfactants improves the wettability with the composition of an substrate to be coated and the leveling property of the composition, prevents the formation of many small protrusions or roughened surface when the composition is coated, facilitates the repeated coating of the composition, and gives the composition improved stability.

The nonionic surfactants include fluorine-containing surfactants having a fluoroalkyl group or a perfluoroalkyl group, and polyether alkyl type surfactants having an oxyalkyl group.

The fluorine-containing surfactants include $C_9F_{19}CONHC_2H_{25}$, $C_8F_{17}SO_2NH-(C_2H_4O)_6H$, $C_9F_{17}O$ (PLURONIC L-35)$C_9F_{17}$, $C_9F_{17}O$(PLURONIC P-84)$C_9F_{17}$, $C_9F_7O$(TETRONIC-704)$(C_9F_{17})_2$ and the like, in which PLURONIC L-35 is a polyoxypropylene-polyoxyethylene block copolymer having an average molecular weight of 1,900 manufactured by ASAHI DENKA KOGYO K.K.; PLURONIC P-84 is a polyoxypropylene-polyoxyethylene block copolymer having an average molecular weight of 4,200 manufactured by ASAHI DENKA KOGYO K.K.; and TETRONIC-704 is an N,N,N',N'-tetrakis(polyoxypropylene-polyoxyethylene block copolymer) having an average molecular weight of 5,000 manufactured by ASAHI DENKA KOGYO K.K. Specific examples of these fluorine-containing surfactants include F TOP EF 301, F TOP EF 303, F TOP EF 352 (these are products of SHIN AKITA KASEI K.K.), MEGAFAC F 171, MEGAFAC F 173 (these are products of DAINIPPON INK & CHEMICALS, INC.), ASAHI GUARD AG 710 (product of Asahi Glass Co., Ltd.), FLUORAD FC-170C, FLUORAD FC 430, FLUORAD FC 431 (these are products of SUMITOMO 3M LIMITED), SURFLON S-382, SURFLON SC 101, SURFLON SC 102, SURFLON SC 103, SURFLON SC 104, SURFLON SC 105, SURFLON SC 106 (these are products of Asahi Glass Co., Ltd.), BM-1000, BM-1100 (these are products of B.M-Chemie) and Schsego-Fluor (product of Schwegmann).

The polyetheralkyl type surfactants include polyoxyethylene alkyl ether, polyoxyethylene allyl ether, polyoxyethylene alkylphenyl ether and the like. Specific examples of these polyether alkyl type surfactants include EMULGEN 105, EMULGEN 430, EMULGEN 810, EMULGEN 920, RHEODOL SP-40S, RHEODOL TW-L120, EMANOL 3199, EMANOL 4110, EXCEL P-40S, ERIJ 30, ERIJ 52, ERIJ 72, ERIJ 92, ARLACEL 20, EMASOL 320, TWEEN 20, TWEEN 60, MYRJ 45 (these are products of Kao Corp.) and NONIPOL (product of SANYO CHEMICAL INDUSTRIES LTD.).

The nonionic surfactants other than the above-mentioned include, for example, fatty acid esters of polyoxyethylene, fatty acid esters of polyoxyethylenesorbitan, polyalkylene oxide block copolymers and the like. Specific examples of these nonionic surfactants include CHEMSTAT 2500 (product of SANYO CHEMICAL INDUSTRIES LTD.), SN-EX 9228 (product of SAN NOPCO LIMITED) and NONAL 530 (product of TOHO KAGAKU KOGYO K.K.).

The amount of the nonionic surfactants used is preferably 0.01–10 parts by weight, particularly preferably 0.1–5 parts by weight, per 100 parts by weight of the total of the components (a) and (b). When the amount is less than 0.01 part by weight, the effect of the nonionic surfactants is not exhibited. When the amount is more than 10 parts by weight, the resulting composition tends to foam and, in some cases, causes color change upon heating.

The composition of this invention can comprise anionic or cationic surfactants besides the nonionic surfactants.

The composition of this invention can further comprise colloidal silica dispersed in water and/or a hydrophilic organic solvent.

This colloidal silica is used to increase the solid content of the composition. The thickness of a coating film formed from the composition can be controlled by adjusting the amount of the colloidal silica used.

When the colloidal silica is used, the organic solvent to be used in the composition must be selected carefully in view of its compatibility with the colloidal silica.

The composition of this invention can further comprise, if necessary, fine powders of metal oxides such as aluminum oxide, zirconium oxide, tin oxide and the like for the purpose of thickening the composition preventing the gelation of the composition, enhancing the heat resistance, chemical resistance, hardness and adhesion of the cured product and impacting an antistatic property to the composition.

The composition of this invention can further comprise other polymers compatible with the components (a) and (b), such as polyamide, polyimide, silicone resin, epoxy resin, acrylate resin, urethane resin and the like.

For the preparation of the composition of this invention, any preparation method may be used; however, it is common to effect the above reaction (A) or (B) in the above-mentioned organic solvent, add a component (b) to the component (a) obtained, and further add, if necessary, the above-mentioned surfactants and the like to prepare the composition.

Thus, the composition of this invention comprises the components (a) and (b) and if necessary other components. The total solids content of the composition is preferably 10–50% by weight, more preferably 15–40% by weight. When the total solids content is less than 10% by weight, the concentration of solids is too low and the protective film formed from the composition does not exhibit its characteristics such as heat resistance, water resistance, chemical resistance, weather resistance and the like in some cases. Also, pin holes appear in the protective film formed, in some cases. When the total solids content is more than 50% by weight, the concentration of solids is too high and such disadvantages are, in some cases, caused that the storage stability of the composition is deteriorated and the formation of a uniform protective film from the composition becomes difficult.

The composition of this invention, even when the above-mentioned additives are incorporated can be formed into a uniform dispersion by high speed stirring or other means.

A protective film having heat resistance, chemical resistance, etc., can be formed the composition of this invention by coating a solution of the composition on a substrate described hereinafter such as a transparent substrate, a color filter or the like according to spray coating, roll coating, curtain coating, spin coating, screen printing or offset printing so that the thickness after drying of the film formed becomes preferably about 0.01–50 μm, particularly preferably about 0.1–10 μm, and curing the resulting film by heating with a heating means such as hot plate, Geer oven or the like at a temperature of about 50°–300° C., preferably about 100°–200° C. for a period of, for example, about 10–120 minutes, or by drying at room temperature for about 1–7 days.

The composition of this invention is suitable for use particularly as a material for forming a protective film for color liquid crystal display devices.

The color liquid crystal display device having a protective film made of the present composition can be produced according to, for example, the following process.

First, a dyed layer consisting of three primary colors of red, green and blue is formed on a transparent substrate according to, for example, a photolithographic method; the composition of this invention is coated thereon and cured to form a protective film; ITO is vapor-deposited thereon; a transparent electrode was formed by photolithography; a liquid crystal aligning layer made of a polyimide or the like was then placed on the ITO and subjected to liquid crystal aligning treatment by rubbing the film with a roll made of a synthetic fiber such as nylon or the like.

Then, the thus treated substrate and an opposite transparent substrate having formed thereon a rubbed liquid crystal aligning layer are placed in parallel with a spacer so that their rubbing directions are perpendicular to each other; the peripheral parts thereof are sealed; the space formed between the two substrates is filled with a liquid crystal to form a color liquid crystal display cell; and a polarizing film is press-bonded to each of the two surfaces of the cell so that the two polarizing films intersect each other to form a color liquid crystal display device.

As the transparent substrate used in the color liquid crystal display device, there can be used transparent substrates made of float-glass, soda-lime glass, flexible polyester (e.g. polyethylene terephthalate, polybutylene terephthalate or the like), polyethersulfone, polycarbonate or other plastic.

As the transparent electrode, there can be used a NESA film composed of $SnO_2$ and an ITO film composed of $InO_2O_3$—$SnO_2$. The patterning of the electrode can be effected according to photolithography or a method using a mask in advance.

The colored layer can be formed according to, for example, the following methods (i) and (ii):

(i) A method wherein a patterned resist layer is formed by a photolithography on a layer to be dyed on a transparent substrate; the exposed portion of the layer to be dyed is dyed to form a dyed portion; the resist layer is thereafter removed; and then the same procedure is repeated to form another dyed portion (this is the so-called flat type method in which a single layer to be dyed is dyed to form several colored portions).

(ii) A method wherein a photosensitive layer to be dyed on a transparent substrate is exposed to a light through a patterned mask and then subjected to development to form a relief pattern to be dyed; the relief pattern is dyed to form a colored layer; the colored layer is then covered with a transparent dying-resistant film; and another colored layer is formed thereon by repeating the same procedure (this is a so-called laminating method in which a layer to be dyed and a dying-resistant layer are alternately formed). Accordingly, the finally obtained colored layer is of lamination type.

The colored layer may also be formed by a printing method, an electrodeposition method or the like besides the photolithography.

The material for the layer to be dyed is not critical, and includes, for example, natural proteins such as gelatin, casein, glue, albumin and the like; synthetic polymers such as polyvinyl alcohol, polyvinylpyrrolidone, polyacrylamide and the like. As the photo-crosslinking agent for imparting photo-sensitivity to these materials, there can be used dichromates such as ammonium dichromate, potassium dichromate and the like and bisazide compounds. Specific examples of the bisazide compounds include water-soluble bisazide compounds such as 4,4'-diazidostilbene-2,2'-disulfonic acid, 4,4'-diazidobenzalacetophenone-2-sulfonic acid, 4,4'-diazidostilbene-α-carboxylic acid, their alkali metal or ammonium salts and the like, and also include p-phenylenebisazide, 4,4'-diazidobenzophenone, 4,4'-diazidostilbene, 4,4'-diazidophenylmethane, 4,4'-diazidobenzalacetophenone, 2,6-di(4'-azidobenzal)cyclohexanone and 2,6-di(4'-azidobenzal)-4-methylcyclohexanone and the like.

The dyes used for the formation of the colored layer include water-soluble dyes such as acid dyes and basic dyes.

As the polarizing films placed on the outer surfaces of the substrates (the outer surfaces of the liquid crystal cell), there can be used a polarizing film consisting of a polarizing film sandwiched between two cellulose acetate protective films, said polarizing film being obtained by allowing a polyvinyl alcohol to absorb iodine while drawing and orientating the polyvinyl alcohol and called an H film, or a polarizing film consisting of an H film per se. As the sealing agent, there can be used, for example, an epoxy resin composition containing a hardening agent and spherical aluminum oxide particles of about 1–10 μm in diameter, which acts as a spacer.

As the sealant for liquid crystal inlet, there can be used organic or inorganic sealants. Organic sealants are preferred because they enable operation at low temperatures.

In adhering a sealing agent to the protective film, it is preferable to previously subject the protective film to a surface treatment with, for example, ultraviolet ray and/or ozone because such a treatment can increase the bonding strength between the sealing agent and the protective film.

The thus produced color liquid crystal display device has excellent orientability and reliability and, when combined with a polarizing film such as linearly polarizing film, circularly polarizing film or the like or a reflector film, it can be effectively used in various means, for example, display means in portable electronic calculator, wrist watch, desk clock, figure-display plate, liquid crystal television and the like.

When the cured film of the composition of this invention is formed on the inner surface of the substrate as a constituent of a liquid crystal display device or on the ITO film formed by vapor deposition on the transparent substrate of the device, there occur no infiltration of impurities from the transparent substrate into the liquid crystal and the insulation between the ITO and the liquid crystal is improved, thus providing a liquid crystal display device of excellent capability.

The present invention is described more specifically below referring to Examples. However, it should not be interpreted that the present invention be restricted to these Examples.

In the Examples, parts and % are by weight unless otherwise specified.

In the Examples, the $Na^+$-oozing-out degree was measured by coating and curing the composition of this invention on a soda-lime glass substrate to form a cured film, immersing the substrate in ultrapure water at 120° C. for 12 hours, determining the amount of Na+ oozed out of the substrate into the water through the film according to atomic absorption photometry, and dividing the amount by the area of the film contacting the water to obtain the amount of Na+ oozed out per unit area of the film.

Reference Example (Production of color filter)

In 80 parts of ultrapure water were dissolved 20 parts of gelatin and 2 parts of ammonium dichromate, and the resulting solution was filtered through a membrane filter having an average pore diameter of 0.2 μm to prepare a photosensitive composition to be used for the formation of a layer to be dyed.

This photosensitive composition was spin-coated on an optically polished glass substrate at a revolution speed of 3,000 rpm and dried in a nitrogen atmosphere. The coating film obtained had a thickness (as dried) of 1 μm.

The above film was irradiated with an ultraviolet ray through a photomask and then subjected to development with ultrapure water to obtain a relief image of gelatin. This relief image was immersed in the following red dying bath and then dried in a nitrogen atmosphere to obtain a red relief image:

Red dying bath

Red-14P (product of NIPPON KAYAKU CO., LTD.): 1 g
Acetic acid: 1 g
Ultrapure water: 98 g A solution containing a glycidyl methacrylate polymer as the main component was spin-coated on the red relief image on the glass substrate and dried in the same manner as above to form a dying-resistant protective film having a thickness (as dried) of 1.0 μm.

On this dying-resistant protective film was formed a relief image of gelatin in the same manner as above. The relief image was immersed in the following green dying bath to obtain a green relief image:

Green dying bath

Green-1P (product of NIPPON KAYAKU CO., LTD.): 1 g
Acetic acid: 1 g
Ultrapure water: 98 g A dying-resistant protective film was formed on the green relief image in the same manner as above, and then a gelatin relief image was formed thereon. The gelatin relief image was immersed in the following blue dying bath to obtain a blue relief image:

Blue dying bath

Blue-5C (product of NIPPON KAYAKU CO., LTD.): 1 g
Acetic acid: 1 g
Ultrapure water: 98 g Thus, a color filter base of three primary colors (red, green and blue) was obtained. Next, a solution containing a glycidyl methacrylate polymer as the main component was spin-coated thereon and dried to form a surface protective film having a thickness (as dried) of 2 μm, whereby a color filter was produced.

EXAMPLE 1

322 g of 3,3′, 4,4′-benzophenonetetracarboxylic acid dianhydride and 644 g of methyl cellosolve were charged into a round bottom flask provided with a dropping funnel and a stirrer. 360 g of 3-aminopropyltriethoxysilane was slowly dropped thereinto from the dropping funnel at 20° C. Then, the mixture was stirred at 20° C. for 2 hours. To the resulting reaction mixture were added 161 g of hexamethyldisilazane and 5 g of a fluorine-containing surfactant (BM-1000, product of B. M. Chemie) to form a uniform solution, which was filtered through a membrane filter having an average pore diameter of 0.2 μm to obtain a curable composition.

This composition was spin-coated on the color filter produced in the Reference Example at a revolution speed of 1,000 rpm and subjected to a heat treatment at 180° C. for 1 hour to form a protective film having a thickness (as dried) of 8 μm.

This color filter with a protective film was irradiated with an ultraviolet ray using a photo-cleaner manufactured by E. H. C., at room temperature for 10 minutes in the presence of oxygen.

ITO was vapor-deposited on the thus produced color filter with a protective film according to an ordinary method. Thereon was formed a desired pattern of a positive-type resist (PFR-3003, product of Japan Synthetic Rubber Co., Ltd.). The exposed portion of ITO was removed by immersing in an aqueous conc. hydrochloric acid-ferric chloride solution at room temperature for 5 minutes. After water-washing, the positive-type resist layer was stripped off.

The thus obtained color filter having a desired ITO pattern was observed in detail using an optical microscope. The color filter and the protective film had neither crack nor wrinkle; no dyes were oozed out of the colored layers of the color filter; and the adhesion between the color filter and the protective film was good.

On the other portions of the above color filter base than the terminal portion of wiring was formed by coating, a liquid crystal-aligning layer of polyimide type (JIB, product of Japan Synthetic Rubber Co., Ltd.). The film was then dried and subjected to a rubbing treatment.

ITO was vapor-deposited on a separate glass substrate according to an ordinary method. On the other portions of the resulting substrate than the terminal portion of wiring was formed a liquid crystal-aligning layer of polyimide type in the same manner as above. The film was then dried and subjected to a rubbing treatment.

A sealing agent containing 1% of a spacer consisting of alumina of 8 μm in particle diameter (the sealing agent: STRUCT-BOND XN-10, product of Mitsui Toatsu Chemicals, Inc.) was applied to the bonding portions between the color filter-provided substrate and the color filter-free substrate to seal the portions other than the liquid crystal inlet. Then, a nematic liquid crystal (ZLI-1565, product of Merck, U.S.A.) was poured into a space formed by the substrates, whereby a liquid crystal cell was prepared.

While a voltage of 30 Hz and 5 V was applied, the above liquid crystal cell was allowed to stand at 60° C. for 2,000 hours. The current value at the end was the same as the initial value of 1 μA and no change was seen.

The above liquid crystal cell was combined with polarizing films to prepare a color liquid crystal display device. The device had no parallax.

Separately, the composition of this invention was coated on a soda-lime glass substrate by a dipping method and then subjected to a heat treatment at 150° C. for 30 minutes to form a protective film having a thickness (as dried) of 0.2 μm. The film has excellent smoothness. The Na+-oozing-out degree of the soda-lime glass was measured to find it as 0.2 ppm. For comparison, the Na+-oozing-out degree of the soda-lime glass substrate alone was 3.0 ppm.

COMPARATIVE EXAMPLE 1

An ITO pattern was formed on the color filter produced in the Reference Example, in the same manner as in Example 1 except that the spin-coating of the composition of this invention was omitted. The resulting color filter was observed in detail. There was discoloration in the colored layers. and fine cracks were seen. Thus, the color filter was unsuitable for practical use.

EXAMPLE 2

Into the same round bottom flask as used in Example 1 were charged 224 g of 2,3,5-tricarboxycyclopentylacetic acid dianhydride and 672 g of N-methyl-2-pyrrolidone. Thereinto were slowly dropped from the dropping funnel a mixture of 221 g of 3-aminopropyltriethoxysilane and 73 g of n-butylamine at 20° C. The resulting mixture was stirred at 20° C. for a further 2 hours.

To the resulting reaction mixture was added 161 g of hexamethyldisilazane and 4 g of a fluorine-containing surfactant (BM-1000, product of B. M. Chemie) to form a uniform solution. The solution was filtered through a membrane filter having an average pore diameter of 0.2 μm to obtain a curable composition.

The curable composition was spin-coated on the color filter produced in the Reference Example at a revolution speed of 2,000 rpm and then heat-treated at 200° C. for 2 hours to form a protective film having a thickness (as dried) of 1.5 μm.

Thereon was formed an ITO pattern in the same manner as in Example 1. The resulting color filter having a desired ITO pattern was observed in detail with an optical microscope. The color filter and the protective film had neither crack nor wrinkle; no dyes were oozed out of the colored layers of the color filter; and the adhesion between the color filter and the protective film was good.

Using the above color filter, a liquid crystal cell was prepared in the same manner as in Example 1. The cell was allowed to stand at 60° C. for 2,000 hours with applying a voltage of 30 Hz and 5 V. The current value at the end was the same as the initial value of 0.8 μA and no change was seen.

Further, the Na+-oozing-out degree of the soda-lime glass substrate was measured in the same manner as in Example 1, to find it as 0.4 ppm.

EXAMPLE 3

A curable composition was obtained in the same manner as in Example 1, except that 450 g of p-aminophenyldiethoxysilane was used in place of the aminopropyltriethoxysilane.

In the same manner as in Example 1, a protective film was formed using the curable composition and a color filter with an ITO pattern was prepared and observed. The color filter and the protective film had neither crack nor wrinkle; no dyes were oozed out of the colored layers of the color filter; and the adhesion between the color filter and the protective film was good.

Using the above color filter with an ITO pattern, a liquid crystal cell was prepared in the same manner as in Example 1. The cell was allowed to stand at 60° C. for 2,000 hours while applying a voltage of 30 Hz and 5 V. The current value at the end was the same as the initial value of 1.1 μA and no change was seen.

Further, the Na+-oozing-out degree of the soda-lime glass substrate was measured in the same manner as in Example 1, to find it as 0.4 ppm.

EXAMPLE 4

292 g of 3,3',4,4'-biphenyltetracarboxylic acid dianhydride and 882 g of N-methylpyrrolidone were charged into the same round bottom flask as used in Example 1. A mixture of 221 g of 3-aminopropyltriethoxysilane and 73 g of n-butylamine was slowly dropped thereinto from the dropping funnel at 20° C. The resulting mixture was stirred at 20° C. for a further 2 hours. To the resulting reaction mixture were added 245 g of hexamethyldisilazane and 6 g of a fluorine-containing surfactant (BM-1100, product of B. M. Chemie) to form a uniform solution. The solution was filtered through a membrane filter having an average pore diameter of 0.2 μm to obtain a curable composition.

This curable composition was coated on a color filter produced according to the printing method, using a roll coater and then heat-treated at 180° C. for 1 hour to obtain a protective film having a thickness (as dried) of 8 μm.

An ITO pattern was formed on the above protective film-provided color filter in the same manner as in Example 1. Then, the color filter with an ITO pattern was observed in detail with an optical microscope. The color filter and the protective film had neither crack nor wrinkle; no dyes were oozed out of the colored layers of the color filter; and the adhesion between the color filter and the protective film was good.

Using the above color filter, a liquid crystal cell was prepared in the same manner as in Example 1. The cell was allowed to stand at 60° C. for 2,000 hours while applying a voltage of 30 Hz and 5 V. The current value at the end was the same as the initial 0.9 μA and no change was seen.

Further, the Na+-oozing-out degree of the soda-lime glass substrate was measured in the same manner as in Example 1, to find it as 0.3 ppm.

EXAMPLE 5

200 g of 4,4'-diaminodiphenyl ether and 300 g of carbitol were charged into the same round bottom flask as used in Example 1. 548 g of 3-trimethoxysilyl-1,2,5,6-tetrahydrophthalic acid anhydride was slowly dropped thereinto from the dropping funnel at 10° C. The resulting mixture was stirred at 10° C. for a further 1 hour. To the resulting reaction mixture were added 203 g of trimethyltriethyldisilazane and 4 g of a fluorine-containing surfactant (BM-1000, product of B. M. Chemie) to form a uniform solution. The solution was filtered through a membrane filter having an average pore diameter of 0.2 μm to obtain a curable composition.

In the same manner as in Example 1, a protective film was formed using the curable composition, and then a color filter with an ITO pattern was prepared and observed. The color filter and the protective film had neither crack nor wrinkle; no dyes were oozed out of the colored layers of the color filter; and the adhesion between the color filter and the protective film was good.

Using the above color filter, a liquid crystal cell was prepared in the same manner as in Example 1. The cell was allowed to stand at 60° C. for 2,000 hours while applying a voltage of 30 Hz and 5 V. The current value at the end was the same as the initial value of 3 μA and no change was seen.

Further, the Na+-oozing-out degree of the soda-lime glass substrate was measured in the same manner as in Example 1, to find it as 0.4 ppm.

EXAMPLE 6

The same round bottom flask as used in Example 1 was purged with a nitrogen gas. Thereinto were charged 35 g of dimethylformamide, 100 g of aminopropyltriethoxysilane and 72.6 g of hexamethyldisilazane. Further, 16.5 g of deionized water was added. The flask was placed in an oil bath at 90° C. to reflux the flask contents for 1 hour. Then, the flask contents were cooled to room temperature. 440 g of carbitol was added, and further 72.7 g of 3,3′,4,4′-benzophenonetetracarboxylic acid dianhydride was added with stirring. The resulting mixture was subjected to reaction at room temperature for a further 1 hour to obtain a solution containing the reaction product having a polystyrene-reduced weight-average molecular weight of 14,000.

To the above solution were added 72.6 g of hexamethyldisilazane and 2.5 g of a fluorine-containing surfactant (BM-1100, product of B. M. Chemie) with stirring to form a uniform solution. The solution was filtered through a membrane filter having an average pore diameter of 0.2 μm to obtain a curable composition.

In the same manner as in Example 1, a protective film was formed using the curable composition and then a color filter with an ITO pattern was prepared and observed. The color filter and the protective film had neither crack not wrinkle, and the adhesion between the color filter and the protective film was good.

EXAMPLE 7

The same round bottom flask as used in Example 1 was purged with a nitrogen gas. Thereinto were charged 35 g of dimethylformamide, 89 g of p-aminophenylmethyldimethoxysilane and 54 g of dimethyldimethoxysilane. Further, 16.5 g of deionized water was added. The flask was placed in an oil bath at 90° C. to heat the flask contents for 1 hour. Then, the contents were cooled to room temperature. 400 g of ethylene glycol monomethyl ether was added. Further, 66 g of 3,3′,4,4′-biphenyltetracarboxylic acid dianhydride was added with stirring. The resulting mixture was subjected to reaction at room temperature for a further 1 hour to obtain a solution containing a reaction product having a polystyrene-reduced weight-average molecular weight of 9,000.

To the solution were added with stirring 91 g of trimethyltriethyldisilazane and 3.1 g of a fluorine-containing surfactant (BM-1100, product of B. M. Chemie) to form a uniform solution. The solution was filtered through a membrane filter having an average pore diameter of 0.2 μm to obtain a curable composition.

In the same manner as in Example 1, a protective film was formed using the curable composition obtained and then a color filter with an ITO pattern was prepared and observed. The color filter and the protective film had neither crack nor wrinkle, and the adhesion between the color filter and the protective film was good.

EXAMPLE 8

The same round bottom flask as used in Example 1 was purged with a nitrogen gas. Thereinto were charged 500 g of dehydrated N-methyl-2-pyrrolidone and 100 g (0.5 mole) of 4,4′-diaminodiphenyl ether. Then, 272 g (1 mole) of 3-trimethoxysilyl-1,2,5,6-tetrahydrophthalic acid anhydride was dropped thereinto at 5°–10° C. over about 30 minutes, and the mixture was subjected to reaction. The reaction mixture was heated to room temperature and subjected to reaction for a further 2 hours to obtain a solution containing a reaction product having a polystyrene-reduced weight-average molecular weight of 3,000. To this solution were added 80 g of hexamethyldisilazane and 4 g of a fluorine-containing surfactant (BM-1000, product of B. M. Chemie) to form a uniform solution. The solution was filtered through a membrane filter having an average pore diameter of 0.2 μm to obtain a curable composition.

In the same manner as in Example 1, a protective film was formed using the curable composition and then, a color filter with an ITO pattern was prepared and observed. The color filter and the protective film had neither crack nor wrinkle, and the adhesion between the color filter and the protective film was good.

What is claimed is:

1. A curable composition comprising the following components (a) and (b):
   (a) (A) a reaction product of a tetracarboxylic acid anhydride with a silicon compound selected from the group consisting of the following compounds of formulas (1) to (6):

and

wherein R, R′ and R″, which may be the same of different, are aliphatic hydrocarbon groups of 1–5 carbon atoms or aromatic hydrocarbon groups of 6–18 carbon atoms; $X^1$, $X^2$ and $X^3$, which may be the same or different, are alkoxy groups of 1–5 carbon atoms or halogen atoms; Y is a divalent aliphatic hydrocarbon group of 1-5 carbon atoms or a divalent aromatic hydrocarbon group of 6-10 carbon atoms or a group in which the divalent aliphatic hydrocarbon group is bonded to the divalent aromatic hydrocarbon group, or (B) a reaction product of a diamino compound with a silicon atom-containing dicarboxylic acid anhydride selected from the group consisting of the following compounds represented by formulas (7) to (9):

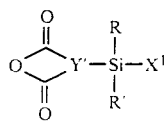 (7)

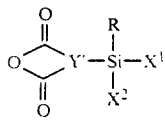 (8)

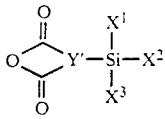 (9)

wherein R and R', which may be the same or different, are aliphatic hydrocarbon groups of 1-5 carbon atoms or aromatic hydrocarbon groups of 6-18 carbon atoms, and wherein $X^1$, $X^2$ and $X^3$, which may be the same or different, are alkoxy groups of 1-5 carbon atoms or halogen atoms, and Y, is a trivalent aliphatic hydrocarbon group of 2-20 carbon atoms, a trivalent alicyclic hydrocarbon group of 3-20 carbon atoms, a trivalent aromatic hydrocarbon group of 6-20 carbon atoms, or a trivalent group wherein these groups are bonded to one another;

(b) an organosilane compound represented by the formula (I):

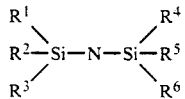 (I)

wherein $R^1$–$R^6$, which may be the same or different, are alkyl groups of 1-10 carbon atoms or aryl groups of 6-10 carbon atoms.

2. The curable composition according to claim 1, wherein the proportion of the component (b) is 5-200 moles per gram equivalent of the total of the carboxyl groups and the imide groups in the component (a).

3. The curable composition according to claim 1, wherein the component (a) is the reaction product (A), and the molar ratio of the tetracarboxylic acid dianhydride to the silicon compound is 1/1 to 1/3.

4. The curable composition according to claim 1, wherein the component (a) is the reaction product (B), and the molar ratio of the diamino compound to the silicon atom-containing dicarboxylic acid anhydride is 1/1 to 1/3.

5. The curable composition according to claim 1, wherein the organosilane compound of the formula (I) is at least one member selected from the group consisting of hexamethyldisilazane, hexaethyldisilazane, hexapropyldisilazane, hexa-n-butyldisilazane, hexa-n-pentyldisilazane, ethylpentamethyldisilazane, diethyltetramethyl-disilazane, trimethyltriethyldisilazane, n-propylpentamethyldisilazane, di-n-propyltetramethyldisilazane, tri-n-propyltrimethyldisilazane, tetramethyldiphenyldisilazane, trimethyltriphenyldisilazane, dimethyltetraphenyldisilazane, triethyltritolyldisilazane and pentamethylα-naphthyldisilazane.

6. A process for producing an amic acid compound which comprises partially hydrolyzing a silicon compound selected from the group consisting of the following compounds of formulas (1) to (6):

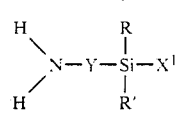 (1)

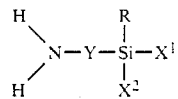 (2)

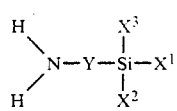 (3)

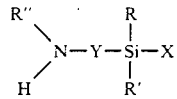 (4)

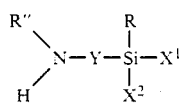 (5)

and

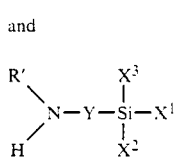 (6)

wherein R, R', and R'', which may be the same or different, are aliphatic hydrocarbon groups of 1-5 carbon atoms or aromatic hydrocarbon groups of 6-18 carbon atoms; $X^1$, $X^2$ and $X^3$, which may be the same or different, are alkoxy groups of 1-5 carbon atoms or halogen atoms; Y is a divalent aliphatic hydrocarbon group of 1-5 carbon atoms or a divalent aromatic hydrocarbon group of 6-10 carbon atoms or a group in which the divalent aliphatic hydrocarbon group is bonded to the divalent aromatic hydrocarbon group in the presence of at least one compound selected from the group consisting of organosilane compounds represented by the formula (I):

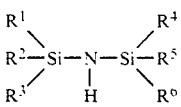 (I)

wherein $R^1$–$R^6$, which may be the same or different, are alkyl groups of 1-10 carbon atoms or aryl groups of 6-10 carbon atoms and organosilane compounds represented by the formula (II):

 (II)

wherein $R^7$ is an organic group of 1-8 carbon atoms, $R^8$ is an alkyl group of 1-4 carbon atoms or an acyl group of 1-4 carbon atoms, and n is an integer of 1-3, and reacting the resulting partial hydrolyzate with a tetracarboxylic acid dianhydride.

7. A process for producing an amic acid compound which comprises reacting a silicon atom-containing dicarboxylic acid anhydride selected from the group consisting of the following compounds represented by formulas (7) to (9):

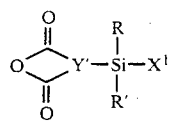   (7)

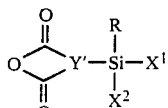   (8)

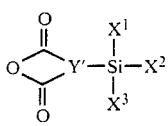   (9)

wherein R and R', which may be the same or different, are aliphatic hydrocarbon groups of 1-5 carbon atoms or aromatic hydrocarbon groups of 6-18 carbon atoms, and wherein $X^1$, $X^2$ and $X^3$, which may be the same or different, are alkoxy groups of 1-5 carbon atoms or halogen atoms, and Y, is a trivalent aliphatic hydrocarbon group of 2-20 carbon atoms, a trivalent alicyclic hydrocarbon group of 3-20 carbon atoms, a trivalent aromatic hydrocarbon group of 6-20 carbon atoms, or a trivalent group wherein these groups are bonded to one another with a diamino compound.

* * * * *